April 16, 1968
B. L. McCRANEY
3,377,863
THERMOMETER WITH IMPROVED VISIBILITY
TEMPERATURE READING SCALE MEANS
Filed Oct. 6, 1965
2 Sheets-Sheet 1
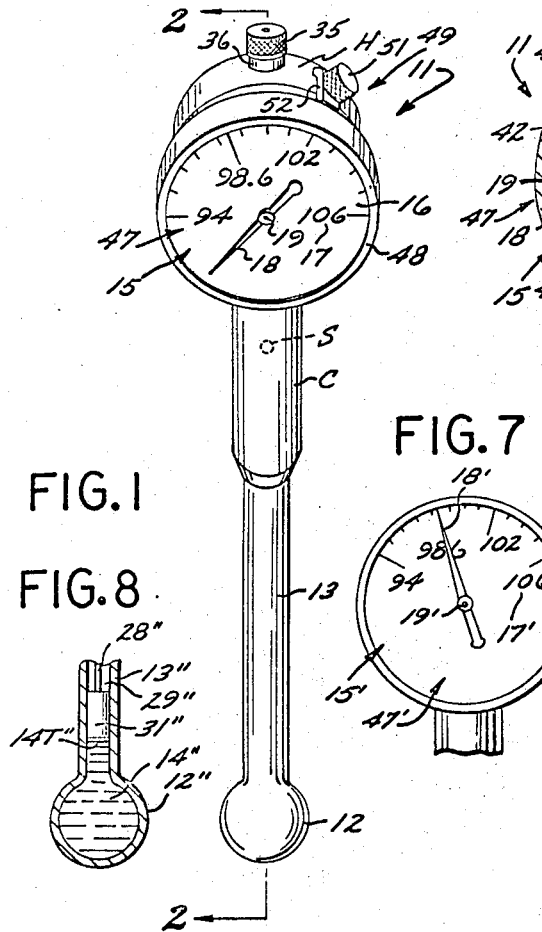
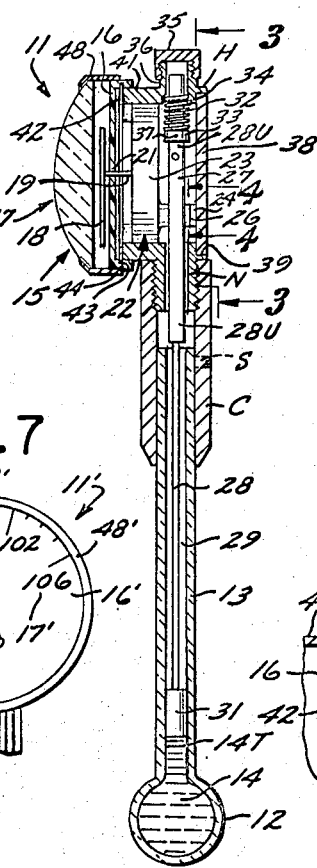
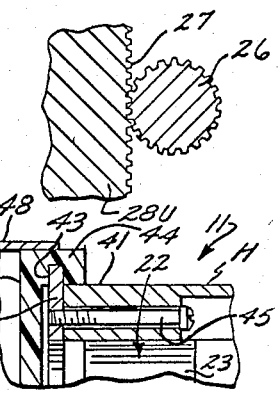
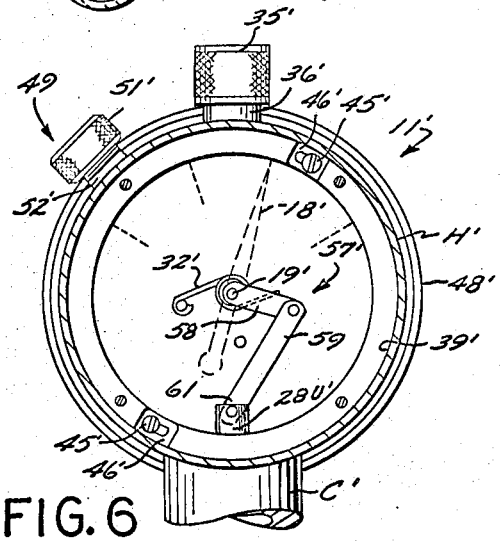
INVENTOR.
BRUCE L. McCRANEY

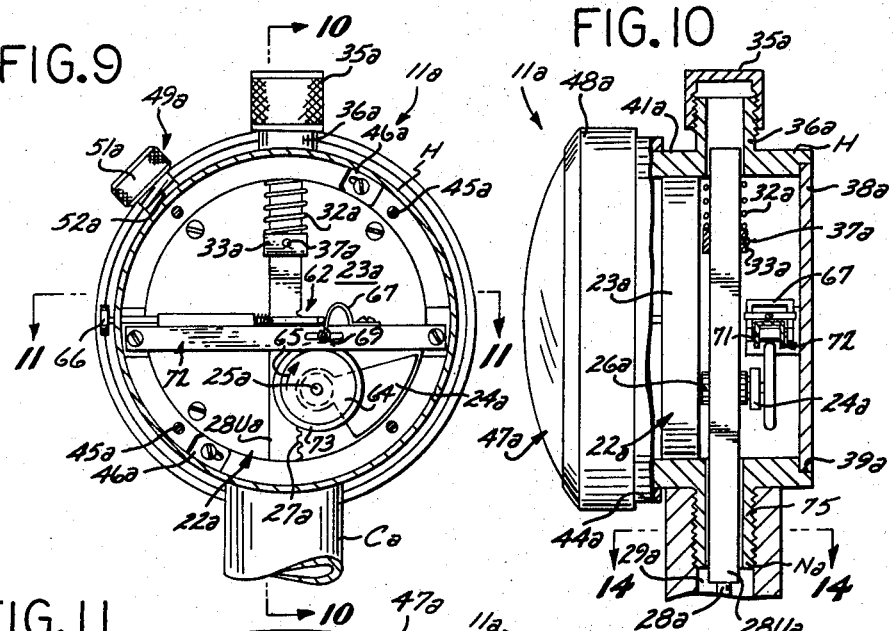
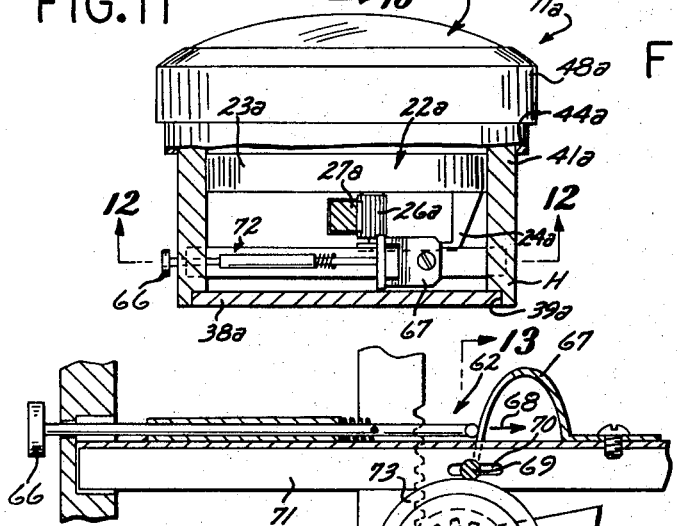
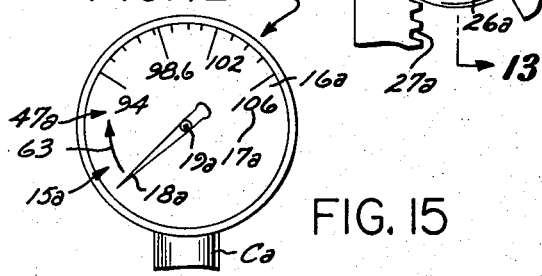

United States Patent Office 3,377,863
Patented Apr. 16, 1968

3,377,863
THERMOMETER WITH IMPROVED VISIBILITY TEMPERATURE READING SCALE MEANS
Bruce L. McCraney, Los Angeles, Calif.
(1270 Kenwood Road, Santa Barbara, Calif. 93105)
Continuation-in-part of application Ser. No. 440,451, Mar. 17, 1965. This application Oct. 6, 1965, Ser. No. 493,372
16 Claims. (Cl. 73—368.3)

ABSTRACT OF THE DISCLOSURE

A thermometer having an enlarged rotary temperature-indicating reading scale means and a pointer cooperating therewith. A lens enhances the readability of the pointer. A temperature-reading-holding means takes the form of one-way movement inactivating means for causing the pointer to be freely movable with respect to the scale in a direction indicating increasing temperature but to become locked upon the termination of a temperature taking measurement and to prevent it from reverse movement until released by the user.

This application is a continuation-in-part of my copending application, Ser. No. 440,451, filed Mar. 17, 1965, and now abandoned, and generally speaking, the present invention relates to the thermometer art and, more particularly, pertains to an improved thermometer which has a temperature reading scale means of greatly improved visibility, as compared to conventional prior art thermometers, and which makes it possible for virtually any person, even with some visual impairment, to accurately and quickly read a temperature indicated on said reading scale means of said improved thermometer. This may be done in the conventional manner after the thermometer is removed from a body orifice of a person whose temperature is being taken or may be read while the thermometer-sensing end of said thermometer is still in inserted relationship within said body orifice—something which is not possible to do with conventional prior art thermometers which, in virtually all cases, must be removed from contact with the patient in order to be placed in a maximum visibility position to enable the temperature to be read.

In one preferred exemplary form of the invention, temperature-reading-holding means is provided and takes the form of a one-way movement-inactivating means adapted to normally effectively allow the pointer means to freely move with respect to the temperature-indicating indicia means in a direction indicating increasing temperature on said indicia means, but adapted to positively prevent reverse rotation of said pointer means in the opposite direction relative to said temperature-indicating indicia means, which comprises a direction indicating decreasing temperature on said indicia means. This condition prevails until said temperature-reading-holding means is effectively manually released, overridden, or reset so as to allow the pointer means to move relative to said temperature-indicating indicia means in a direction indicating decreasng temperature and to thus return back to a predetermned low temperature point ready for subsequent use in taking a person's temperature. This mode of operation is made feasible because of the fact that the normal temperature of a human being's body is substantially higher than the normal temperature of ambient atmosphere. However, positive means for returning the pointer to a predetermined low temperature point prior to the next body temperature measuring operation may also be employed rather than to rely upon a lower ambient temperature for this purpose. It will be understood that the above-described arrangement makes it possible to take one's time in reading a temperature which has just been measured since the pointer means will not recede from the maximum temperature which has just been measured until manually released or reset by a person such as a nurse, physician, or even a patient using the novel thermometer of the present invention.

Additionally, it should be noted that, in one form of the invention, the thermometer itself may be largely made of metal rather than the conventional glass, or the like, of prior art thermometers which has been made necessary in the case of prior art thermometers in order to make it possible to view the end of the expanded column of mercury, which is the indicating means of such a conventional prior art thermometer, whereas, in the case of the present invention, no such viewing of the interior mercury is necessary. In such a form of the invention, the superior heat transfer characteristics of the metal envelope enclosing the mercury, or other temperature-responsive working medium therein, may be such as to make it possible to greatly minimize the conventional heat transfer lag which occurs in conventional prior art thermometers. This makes it possible to obtain a correct temperature reading extremely rapidly and without the necessity of waiting three to five minutes in the manner of such a conventional prior art thermometer which is made necessary by such heat transfer lag because of the extremely low heat transfer rate which can occur across the conventional prior art glass tubing envelope and lower reservoir containing the mercury.

It should also be noted that the tube or tubing portion and the lower reservoir portion of the thermometer may, in certain forms of the invention, be made of plastic material which may be of a non-frangible or non-breakable type and which may be sufficiently resistant to the action of sterilization means employed for sterilizing the thermometer between uses to have no deleterious effects produced thereon by said sterilizing means. For example, if chemical germicidal solutions or ultraviolet sterilization or radiation sterilization, or the like, is employed, one such material might comprise polyethylene material, although this is not to be construed as limiting the invention thereto, but merely as exemplary of many different types of plastic materials of a relatively non-breakable type which may be employed for such purposes. This form of the invention will normally have a lower heat transfer rate than the metallic form referred to in the preceding paragraph and may tend to have a heat transfer lag approaching that of conventional prior art glass thermometers. However, the very decided advantage of being substantially unbreakable provides a vastly superior thermometer, as compared to conventional and extremely breakable prior art glass thermometers, in this form of the invention. Also, it may be possible, even in this form of the invention, to employ a substantially non-breakable plastic material having a maximum heat transfer characteristic and so designed as to minimize the above-mentioned thermal lag, where such a fast response characteristic is desired.

In addition to the improved visibility factor referred to above, which is provided by a different type of circular or arcuate reading scale means from the longitudinal linear reading scale means of conventional prior art thermometers, it should also be noted that suitable magnifying lens means having any desired degree of magnification is positioned in front of said reading scale means, in a preferred exemplary form of the invention, thus providing any desired degree of visibility of the temperature reading or indicating scale means.

It should additionally be noted that the novel improved thermometer of the present invention is also provided with controllably adjustable calibrating means making it possible to very accurately calibrate the thermometer so that the indication provided by the pointer means of the improved temperature reading scale means may at all times be accurate to any desired degree even though hard usage and various aging factors and the like may have caused the thermometer to have shifted from its initial accurate calibration. This is not true of conventional prior art thermometers which, in some cases, may be inaccurate or may become inaccurate and cannot be recalibrated by a user.

With the above points in mind, it is an object of the present invention to provide an improved thermometer of the character referred to herein, having any or all of the advantages referred to herein and including any or all of the features referred to herein, generically and/or specifically, and individually or in combination, and which is of extremely simple, inexpensive construction adapted for ready mass manufacture at relatively low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated in the hereinbelow-described figures of the accompanying two drawing sheets and are described in detail hereinafter.

FIG. 1 is a greatly enlarged, front, three-dimensional, exterior pictorial view of one exemplary embodiment of the invention as seen from a position in front of and above the upper end thereof.

FIG. 2 is a substantially central plane, sectional view, taken substantially along the plane indicated by, and in the direction of, the arrows 2—2 of FIG. 1, although certain interior portions of the apparatus are shown in elevation rather than in section.

FIG. 3 is an additionally enlarged, fragmentary view, taken substantially along the staggered-line plane indicated by the arrows 3—3 of FIG. 2, with certain portions of the apparatus being shown in full elevation, certain portions being shown in partial elevation with parts thereof broken away into a sectional plane, and with certain portions being shown in full vertical section—all for the purpose of providing the maximum disclosure in said view.

FIG. 4 is an enlarged, fragmentary, sectional view, taken substantially along the plane indicated by the arrows 4—4 of FIG. 2 and illustrates the upper end part of the linear-to-rotary movement coupling means adapted to effectively interconnect the mercury, or other temperature-responsive working medium, of the thermometer with respect to the rotary pointer means of the temperature reading scale means, or meter means, at the top of the apparatus. All other portions of the apparatus and, in particular, the portions behind the plane of FIG. 4 are not shown for reasons of drawing simplifications and clarity.

FIG. 5 is an enlarged, fragmentary, sectional view, taken substantially on the plane indicated by the arrows 5—5 of FIG. 3 and further illustrates certain details of the structure of the upper meter means portion of the apparatus and the means for attaching same together.

FIG. 6 is a view very similar to FIG. 3, but illustrates a slight modification of the invention having a different type of linear-to-rotary movement coupling means for effectively interconnecting the mercury, or other temperature-responsive working medium, with respect to the temperature reading scale means, or meter means, at the top of the apparatus.

FIG. 7 is a reduced-size, front view of the circular scale panel and arcuately arranged indicia means carried in a visibly viewable manner by the other or front side of the modified form of the invention illustrated in FIG. 6.

FIG. 8 is a fragmentary view very similar to the bottom portion of FIG. 2 and merely illustrates a change of material from that illustrated in FIG. 4.

FIG. 9 is a fragmentary view very similar to FIG. 3 of the first form of the invention but illustrates a very slight modification thereof additionally including temperature-reading-holding means comprising one-way movement inactivating means which allows the pointer on the opposite side thereof, as shown in FIG. 15, to freely move in a manner indicating increasing temperature but to prevent its moving in the opposite direction after a temperature-measuring operation has been performed until such time as it is manually released or reset by operation of a manual overriding control member. This effectively holds the maximum temperature reading attained by the pointer until controllably manually released or reset by a user of the thermometer.

FIG. 10 is a fragmentary side view, in elevation with respect to the front portion of the apparatus and in section substantially along the plane indicated by the arrows 10—10 of FIG. 9 with respect to the rear portion of the apparatus of FIG. 10.

FIG. 11 is a top view, again with the front portion of the apparatus in full top plan view elevation and with the rear portion of the apparatus seen in cross-section substantially on the plane indicated by the arrows 11—11 of FIG. 9.

FIG. 12 is an enlarged fragmentary, partly-broken-away view taken substantially along the plane indicated by the arrows 12—12 of FIG. 11 and with certain portions of the apparatus removed for reasons of drawing simplicity and clarity.

FIG. 13 is a fragmentary partially-broken-away sectional view taken substantially along the plane indicated by the arrows 13—13 of FIG. 12.

FIG. 14 is a cross-sectional view taken along the plane indicated by the arrows 14—14 of FIG. 10.

FIG. 15 is a view generally similar to FIG. 7 but comprises a front view of the modified form of the invention illustrated in FIGS. 9–14 inclusive.

Generally speaking, the exemplary first form of the invention illustrated in FIGS. 1–5 inclusive may be said to comprise an expansion type thermometer means, such as is generally designated at 11, which includes a bottom-positioned hollow reservoir means 12 and a hollow tube 13 extending therefrom and in interior communication with said reservoir means 12, which normally carries therein a temperature-responsive working medium, such as is indicated at 14 in FIG. 2, which may comprise mercury or various other temperature-responsive working mediums which are usually of the type having a substantial positive temperature coefficient of expansion, although it is possible to employ a working medium 14 having a negative temperature coefficient of expansion, in which case the arcuately arranged indicia means referred to hereinafter may be positionally reversed so as to indicate increasing temperatures as a result of counter-clockwise movement of the hereinafter referred to pointer means in a manner exactly opposite to the arrangement described hereinafter in detail in connection with said elements of the first form of the invention when the temperature-responsive working medium 14 has a positive temperature coefficient of expansion. Of course, it is also possible to reverse or otherwise modify the linear-to-rotary movement coupling means also referred to hereinafter, to allow the same type of pointer and arcuately arranged indicia means to be employed as that shown in FIG. 1, even when the working medium 14 has a negative temperature coefficient of expansion.

The exemplary first form of the invention also includes what might be generally referred to as an indicating meter means, generally designated at 15, or which might be referred to as a circular type temperature reading scale means, generally designated by said reference numeral 15, which includes a substantially flat (although not necessarily so limited) circular scale panel 16, arcuately provided with temperature-indicating indicia means, such as shown at 17 as best illustrated in FIG. 1, and comprising the numerals and intervening markings ranging from a low or minimum temperature of 94 through an intermediate normal temperature of 98.6 to a maximum or high temperature of 106 in the exemplary form illustrated, although not specifically so limited in all forms of the invention.

The above-mentioned temperature reading scale means, or meter means, generally designated at 15 is also provided with pointer means 18 rotatively mounted by a rearwardly directed pivot pin or shaft indicated at 19, which extends rearwardly through an aperture 21 in the flat, circular scale panel 16 to a position therebehind where it is connected to the output end of a gear train means, generally designated at 22 and shown as being completely enclosed in a gear box case or housing 23 having a rearwardly extending or projecting portion 24 provided with a rearwardly extending input shaft 25 rigidly carrying a pinion gear 26 thereon.

It will be noted that the above-described arrangement effectively provides a rotary mounting for the pointer means 18 for arcuate movement along the indicia means 17 of the temperature reading scale means or meter means generally designated at 15 and that movement of the pointer means 18 will be in accordance with the movement of the input pinion gear means 26, which is effectively driven by a longitudinally toothed rack means 27 carried by an upper end portion 28U of a connecting rod 28 which extends downwardly through the hollow inside bore 29 of the thermometer tube 13 and is there connected to a piston 31 which is slidably mounted within said bore 29 and which is in contact with the top surface 14T of the mercury or other working medium 14.

The arrangement just described obviously provides one exemplary type of linear-to-rotary movement coupling means effectively interposed between the top surface 14T of the working medium 14 and the previously mentioned rotary pointer means 18 for effectively rotating same in a direction indicating increasing temperature on said arcuate indicia means 17 in response to expansion of the working medium 14 as a result of increasing temperature thereof. Of course, the converse is also true—that is, contraction of the working medium 14 as a result of decreasing temperature thereof will effectively lower the level 14T of the top surface thereof, and this will, of course, allow the piston 31 to move downwardly under the action of the return biasing spring means 32 carried at the top of the upper connecting rod portion 28U and abutting collar 33 thereon, which will, by way of the toothed rack 27 and pinion gear 26 and gear train 22, cause the pointer means 18 to rotate in a counterclockwise direction indicating a decreasing temperature on the arcuate indicia means 17 of the meter means 15.

It should be noted that, in the exemplary form illustrated, there is a small recess 34 in the housing H which is adapted to receive the upper end of said return biasing spring 32, while the lower end thereof rests against the previously mentioned collar 33. It should also be noted that a threaded cap member 35 is carried by a correspondingly threaded, upwardly directed, apertured extension neck 36 which facilitates assembly of the entire linear-to-rotary movement coupling means comprising the elements 19, 22, 25, 26, 27, 28U, 28, and 31. However, this is for convenience only and may be modified substantially or eliminated entirely in certain forms of the invention. It should also be noted that the collar 33 is fastened to the upper end of the connecting rod portion 28U by a mounting pin or screw 37 in the exemplary form illustrated.

To further facilitate assembly, the housing portion H has a rear closure cover member 38 which is adapted to be fitted into the rear recess 39 and either retained therein by reason of a pressfit engagement therewith or by mounting screws extending forwardly.

In the exemplary first form illustrated, the previously mentioned flat, circular scale panel 16 is retained on the annular frontwardly directed wall portion 41 of the housing H by a retaining or lock ring 42 which is resiliently snapped into a groove 43 on the inside of the rearwardly directed flange 44 carried by said circular scale panel 16, which is preferably made of resilient plastic material and may be circumferentially exteriorly knurled for purposes to be described.

Said retaining or lock ring 42 is fastened to the front surface of said forwardly projecting annular wall 41 of the housing H by a plurality of forwardly directed mounting screws 45 lying in forwardly cut out recesses 46 in said annular wall portion 41.

The preferred form of the invention is adapted to be provided with magnifying lens means, such as is generally designated at 47, and which may comprise a plano-convex lens means of a conventional type, although it may preferably be made of non-breakable plastic material in certain forms of the invention, such as a lens made of molded acrylic resin material of a type commonly known in the art as "Lucite" or "Plexiglas," or other functionally equivalent material, although the invention is not specifically so limited in all forms thereof. Said magnifying lens means 47 is frictionally mounted in front of the indicia means 17 and pointer means 18 for effectively magnifying the images thereof to any desired degree for visibility enhancing purposes by a rearwardly directed flange 48 which is adapted to merely frictionally slip over the previously mentioned rearwardly directed exteriorly knurled flange 44 carried by the flat circular scale panel 16, thus providing an arrangement making it possible to quickly and easily mount the magnifying lens means 47 in appropriate magnifying relationship with respect to the indicia means 17 and pointer means 18. However, various other mounting means may be employed in lieu of the specific exemplary arrangement just described.

The exemplary first form of the invention illustrated also includes calibration means such as is generally designated in part at 49, and which also includes the previously mentioned resilient rearwardly directed elastic flange 44 carried by the flat circular scale panel 16, which is adapted to be forcibly rotated with respect to the annular forwardly directed wall portion 41 of the rear housing H which will, of course, correspondingly rotate the entire flat circular scale panel 16 and the indicia 17 with respect to the rear housing H and also with respect to the pointer means 18, thus providing appropriate calibration of the pointer 18 with respect to the indicia means 17 to give an accurate temperature reading which corresponds exactly to the true temperature (usually a predetermined standard temperature) to which the working medium 14 is subjected during a calibration period. The calibration means 49 also includes the controllably lockable thumb screw means 51 threadedly carried by the annular wall 41 of the housing H and also carrying a frictional locking abutment member 52, which extends across and rests upon the outer surfaces of both the annular wall 41 of the rear housing H and also the rearwardly directed exterior flange 44 of the rotatable, flat, circular, scale panel 16, thus making it possible to release same for relative rotation when desired for calibration purposes by loosening the thumb nut 51 and thus also making it possible to lock same in a manner preventing relative rotation thereof when the thumb nut 51 is tightened. This provides a convenient type of calibration means, but various other forms of calibration means may be employed in lieu thereof.

It will be noted that, as is clearly shown in FIG. 3, a guide pin 53 is carried by the previously mentioned upper connecting rod portion 28U and is adapted for vertical guiding movement in a slot 54 of a bracket member 55 fastened by fastening screws 56 with respect to the housing H. This arrangement is for the purpose of maintaining the proper engagement of the toothed rack portion 27 with the toothed pinion gear 26, which might otherwise become inadvertently disengaged in the event that the connecting rod 28, or the upper portion 28U thereof, inadvertently becomes rotated around the vertical longitudinal axis thereof.

In the exemplary first form of the invention illustrated, the thermometer tube 13 is effectively connected with respect to the meter means 15 by a coupling sleeve C, which is interiorly threaded at its upper end and which threadedly engages an exteriorly threaded downwardly directed nipple portion N carried by the housing H; said coupling sleeve C receiving the upper end of the tube 13 in a frictionally pressfit manner or being provided with fastening or set screw means S for fastening same together. It should be noted that this construction is an exemplary one only which provides for convenience in assembly of the elements referred to, but that, in actual manufacture, various other constructions and means of assembly may be provided and are intended to be included and comprehended within the broad scope of the present invention.

It should also be noted that the various elements of the device may be made of various suitable materials other than the metal shown for the meter means 15 and the coupling sleeve C. This is also true of the tube 13 and reservoir means 12, which may be made of glass or plastic, both of which are designated by the type of crosshatching shown in FIG. 2, or may be made of metal or various other suitable materials as referred to hereinafter. Incidentally, it should be noted that the crosshatching of FIG. 2 designates the tube 13 and reservoir means 12 as being made of a transparent material (which might be either glass or plastic), but it should be clearly noted that the invention is not specifically so limited and that non-transparent material may also be employed in lieu thereof, if desired.

FIGS. 6 and 7 merely fragmentarily illustrate a slightly modified form of the invention wherein all portions are the same as in the first form of the invention with the exception of the upper part of the previously mentioned linear-to-rotary movement coupling means and, therefore, all of said similar parts are indicated by similar reference numerals, primed, however, and new numerals are employed only for new or very substantially modified portions of this form of the invention. It will be noted that, in this modification, the upper connecting rod portion 28U' does not have rack teeth corresponding to those shown at 27 in the first form of the invention and, indeed, said upper connecting rod portion 28U' does not extend upwardly as far as in the case of the first form of the invention and there is no compression biasing return spring at the top thereof, such as that shown at 32 in the first form of the invention. In this modification, said shortened upper connecting rod portion 28U' is provided with rotatable crank means, such as generally designated at 57, adapted to effectively couple the pointer shaft 19' of the pointer means 18' with respect to said upper connecting rod portion 28U' in a manner effectively converting linear movement of said connecting rod upper portion 28U' into rotary movement of said pointer means 18' for movement with respect to a slightly modified and repositioned indicia means 17' in a manner functionally equivalent to that previously described in connection with the first form of the invention.

It will be noted that the crank means 57 comprises two pivotally interconnected linkage members 58 and 59 having an input end 61 pivotally connected to said upper end of said upper connecting rod portion 28' and having an opposite or output end coincident with, and firmly connected and coupled with respect to, said pointer means shaft 19'.

Also, this modification of the invention has a return biasing spring means 32' which is differently positioned from the return biasing spring means 32 of the first form of the invention and is of the torsional type rather than the compression type of the first form of the invention. Otherwise, this modification of the invention is substantially identical to the first form thereof, and no further description is thought necessary.

FIG. 8 merely fragmentarily illustrates a very slight modification of any of the forms of the invention and, because of the similarity thereof to the earlier forms of the invention, similar reference numerals, doubly primed, however, are employed to designate corresponding parts. It will be noted that FIG. 8 shows a portion very similar to the bottom part of FIG. 2 since this is believed to be entirely adequate to illustrate the essence of the modification comprising this form of the invention; said modification merely comprising the changing of the material of which the reservoir means 12 and the tube 13 are made from either glass (which is usually breakable) or plastic (which is usually of a substantially breakable type) to metal, which is not only not breakable, but which additionally normally has vastly superior heat transfer characteristics as compared to either glass or plastic and thus makes it possible for heat transfer to occur much more rapidly through the walls of the reservoir means 12" into the working medium 14" so that the working medium may expand very rapidly in response to increasing temperature and may also contract very rapidly in response to decreasing temperature, thus minimizing thermal lag and making it possible to get very quick temperature readings.

FIGS. 9–15 inclusive illustrate a further modification of the first form of the invention illustrated in FIGS. 1–5 inclusive, and similar parts are designated by similar reference characters, followed by the letter "a," however. The major change of this modification of the invention from the first form shown in FIGS. 1–5 inclusive is the additional inclusion of temperature-reading-holding means, generally designated by the reference numeral 62, which takes the form of a one-way movement-inactivating means which is effectively cooperable with respect to the pointer means 18a, shown in FIG. 15, which is similar to the pointer means 18 of the first form of the invention, as clearly shown in FIG. 1, whereby to cause said pointer means 18a to be normally freely rotatable in a direction indicating increasing temperature, as designated by the arrow 63 in FIG. 15 (which corresponds to the direction of rotation of the rollable wheel means 64 indicated by the arcuate directional arrow 65 of FIG. 9).

The one-way movement-inactivating means, generally designated at 62, is adapted to positively prevent reverse rotation of the pointer 18a from that indicated by the directional arrow 63 of FIG. 15 and to correspondingly positively prevent reverse rotation of the rollable wheel means 64 of FIG. 9 from that indicated by the arcuate directional arrow 65 of FIG. 9 except when the manual overriding push-button control member 66 is temporarily inwardly depressed against the curved leaf spring biasing means 67 so that the free left side thereof is moved in the direction of the arrow designated by the reference numeral 68 in FIG. 12. When this occurs, the lower end of said left side of said leaf spring 67 is moved in the direction of said arrow 68 and correspondingly moves the transverse snubbing pin 69 toward the right within the slot 70 carried in the side wall portions 71 of the U-shaped channel iron member generally designated by the reference numeral 72.

The above-described action effectively increases the distance between said transverse snubbing pin 69 and the input shaft 25a carrying the pinion gear 26a thereon and thus causes a temporary disengagement of the normal frictional engagement of said transverse snubbing pin 69 and the frictional exterior rim portion 73 of the rollable wheel means 64 so as to allow said rollable wheel means 64 to freely rotate in a direction opposite to the arrow 65 of FIG. 9. This in turn allows the pointer 18a to also rotate in a direction opposite to the directional arrow 63 of FIG. 15 and thus brings about the return of the pointer 18a to the position shown in FIG. 15 where it is at the low end of the indicia means 17a and is ready for a subsequent body temperature measuring operation.

It should be clearly noted that during a temperature-measuring operation it is not necessary to actuate the overriding means 66 in the manner described above since rotation of the rollable wheel means 64 in the permitted direction indicated by the directional arrow 65 of FIG. 9 (which corresponds to a temperature increasing direction of rotation of the pointer 18a as indicated by the directional arrow 63 of FIG. 15) causes the frictional rim 73 to move the transverse snubbing pin 69 toward the right as viewed in FIG. 12 in a manner similar to the movement produced by manual operation of the overriding means 66 and thus it can be said that said rollable wheel means 64 is freely rotatable in the direction of the arrow 65 at all times and that the pointer means 18a is freely rotatable in the direction of the arrow 63 at all times—both of which may be said to comprise directions corresponding to increasing temperature—while neither of said elements 64 and 18a is capable of rotating in the reverse direction unless the manually operable overriding means 66 is temporarily manually operated for thermometer resetting purposes.

Therefore, it will be understood that, whenever the modified form of the thermometer illustrated in FIGS. 9–15 is used for measuring the temperature of a person's body, it will hold the temperature reading indicated on the indicia means 17a by the pointer 18a as long as desired and, indeed, until the push-button of the manually operable overriding means 66 is depressed in order to reset the theremometer for the next body temperature measuring operation.

In order to provide sufficient clearance for the entire temperature-reading-holding means 62 in the modified form of the invention illustrated in FIGS. 9–15, said modification has no elements corresponding to those shown at 53, 54, 55, and 56 in the first form of the invention illustrated in FIGS. 1–5 and an alternate arrangement for preventing rotation of the upper portion 28Ua of the connecting rod 28a is provided and is clearly shown in FIG. 14, wherein said upper connecting rod portion 28Ua is shown as being rectangular in cross-section and sliding in the corresponding rectangularly-shaped opening 74 of the threaded nipple 75, thus preventing rotation of said complete connecting rod 28a. However, various other functionally equivalent arrangements may be provided in lieu thereof. The remainder of this modified form of the invention functions generally similar to the first form of the invention illustrated in FIGS. 1–5 and no further detailed description thereof is thought necessary.

It should be noted that the type of temperature-reading-holding means generally designated at 62 in the modified form of the invention illustrated in FIGS. 9–15 inclusive may also be employed with an arrangement of the type illustrated in FIG. 6 by merely having the rollable wheel means 64 effectively connected with respect to the shaft 19' of the FIG. 6 form of the invention. Also, this modification may be employed with any of the other previously-described and previously-illustrated variations of the basic invention.

Additionally, it should be noted that in lieu of the frictional rollable wheel means 64 and snubbing pin 69 (and associated elements) of the form of the invention illustrated in FIGS. 9–15, a toothed ratchet wheel (or functional equivalent thereof) may be employed in lieu of the rollable wheel means 64 and a spring-biased locking pawl or dog may be positioned adjacent thereto for normal locking engagement with said ratchet wheel in one direction of rotation thereof and for freely allowing the oppositely directed rotation thereof, and a manually operable over-riding means equivalent to that shown at 66, and which will effectively temporarily disengage the locking pawl from the ratchet wheel, may be employed in lieu of the arrangement illustrated in FIGS. 9–15 and described in detail hereinbefore. Also, various other effective functional equivalents thereof, and effectively comprising one-way movement-inactivating or movement-immobilizing means, may be employed in lieu of the exemplary structure generally designated by the reference numeral 62.

It should be noted that, while I have referred to the reservoir means and tube means as being made of glass, plastic, or metal, actually any suitable material may be employed therefor and need not be transparent in the manner of prior art thermometers, in view of the meter means bearing the indicia means and having the rotable pointer means in front thereof.

It should also be noted that the material of the entire device may be such as to facilitate sterilization by any suitable means, such as by germicidal materials or in any other desired manner and, in order to facilitate this, the entire device may be of sealed construction or may be provided with suitable sealing means to prevent the undesired entry of any such germicidal material into the interior of the device during such a sterilizing operation.

It should also be noted that the relative dimensions, proportions, and size of the device are greatly exaggerated in the figure of the drawings for purposes of clarification and simplification. Actually, the entire thermometer portion of the device need be no larger than any conventional thermometer, and the meter means at the top thereof may have an exterior diameter not much larger than a twenty-five cent piece or the like, although not specifically so limited in all forms of the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A thermometer with an improved visibility temperature reading scale means, comprising: variable volume type thermometer means including a reservoir and tube extending therefrom interiorly provided with a temperature-responsive working medium; a temperature indicating meter means and reading scale means including a scale panel arcuately provided with temperature-indicating indicia means and provided with pointer means rotatively mounted for relative rotary movement of said pointer means along said arcuately arranged indicia means to indicate a temperature reading; and linear-to-rotary movement coupling means having one end portion thereof effectively coupled with respect to said working medium within said tube, said coupling means having another end portion effectively engaged and coupled with respect to said rotary pointer means for rotating same in a direction indicating increasing temperature on said arcuate indicia means in response to volumetric change of said working medium as a result of increasing temperature thereof; and temperature-reading-holding means taking the form of one-way movement inactivating means cooperable for effectively causing said pointer means to be held in a temperature-indicating relationship with respect to said temperature-indicating indicia means in a manner positively preventing reverse rotation of said rotary pointer means in a direction indicating decreasing temperature on said indicia means but freely allowing said oppositely directed rotation of said rotary pointer means in said direction indicating increasing temperature on said indicia means, said one-way movement inactivating means comprising a rotatable lockable member coupled with respect to said rotary pointer means for movement therewith, and a locking member mounted adjacent to said rotatable lockable member for movement between a normal engaged and locking position with respect to said rotatable lockable member for normally locking it in a manner positively preventing said reverse rotation of said pointer means and a disengaged position with respect to said rotatable lockable member in response to rotation of said rotatable lockable member in a manner corresponding to rotation of said pointer means in a forward manner indicating increasing temperature on said indicia means, biasing means normally biasing said locking member toward said engaged and locking position, and manually operable overriding means effectively operable for moving said locking member from said engaged and locking position toward and into said disengaged position with respect to said rotatable lockable member.

2. Apparatus as defined in claim 1, wherein said coupling means comprises a piston slidably mounted in said hollow tube in effective driven contact with a remote end surface of said working medium therein, said piston being provided with a connecting rod extending into a position within said temperature indicating meter means and reading scale means and there being provided with a longitudinally toothed rack means, said coupling means also including a tooth pinion gear means in engagement with said rack means and effectively connected with respect to said pointer means for rotating same in response to longitudinal movement of said piston means.

3. Apparatus as defined in claim 1, wherein said coupling means comprises a piston slidably mounted in said hollow tube in effective driven contact with a remote end surface of said working medium therein, said piston being provided with a connecting rod extending into a position within said temperature indicating meter means and reading scale means and there being provided with a longitudinally toothed rack means, said coupling means also being provided with a toothed pinion gear means and movement-increasing gear train means connected thereto at an input end thereof and connected at an output end thereof to said pointer means for rotating same in response to longitudinal movement of said piston means.

4. Apparatus as defined in claim 1, including calibration means comprising relative rotary position adjustment means for relatively rotatively adjusting the initial position of said pointer means with respect to said arcuate indicia means of said scale panel to cause the indicated reading thereof to exactly correspond to the actual temperature to which said working medium is subjected.

5. Apparatus as defined in claim 1, including calibration means comprising means adjustably rotatively mounting said scale panel with respect to said pointer means and means for controllably locking said rotatably mounted scale panel in any selected relatively rotative position with respect to said pointer means.

6. Apparatus as defined in claim 1, wherein said coupling means comprises a piston slidably mounted in said hollow tube in effective driven contact with a remote end surface of said working medium therein, said piston being provided with a connecting rod extending into a position out of said tube and within said temperature indicating meter means and temperature reading scale means and there being provided with rotatable crank means comprising two pivotally interconnected linkage members having one end pivotally connected to the upper end of said connecting rod and having the other end thereof firmly connected and coupled with respect to said pointer means for rotating same in response to longitudinal movement of said piston means.

7. A thermometer with an improved visibility temperature reading scale means, comprising: variable volume type thermometer means including a reservoir and tube extending therefrom interiorly provided with a temperature-responsive working medium; a temperature indicating meter means and reading scale means including a scale panel arcuately provided with temperature-indicating indicia means and provided with pointer means rotatively mounted for relative rotary movement of said pointer means along said arcuately arranged indicia means to indicate a temperature reading; and linear-to-rotary movement coupling means having one end portion thereof effectively coupled with respect to said working medium within said tube, said coupling means having another end portion effectively engaged and coupled with respect to said rotary pointer means for rotating same in a direction indicating increasing temperature on said arcuate indicia means in response to volumetric change of said working medium as a result of increasing temperature thereof; said temperature indicating meter means and reading scale means further including magnifying lens means positioned in front of said pointer means and scale panel bearing said arcuately arranged indicia means for effectively enlarging the viewed images thereof for facilitating the reading of a temperature; and temperature-reading-holding means taking the form of a one-way movement inactivating means cooperable for effectively causing said pointer means to be held in a temperature-indicating relationship with respect to said temperature-indicating indicia means in a manner positively preventing reverse rotation of said rotary pointer means in a direction indicating decreasing temperature on said indicia means but freely allowing said oppositely directed rotation of said rotary pointer means in said direction indicating increasing temperature of said indicia means, said one-way movement inactivating means comprising a rotatable lockable member coupled with respect to said pointer means for free rotation of said rotatable, lockable member in a direction corresponding to movement of said pointer means in said direction indicating increasing temperature on said indicia means, said rotatable lockable member having an arcuate exterior engaging portion spaced a predetermined radial distance from the center of rotation thereof, a locking member mounted adjacent to said arcuate exterior engaging portion for movement between an outer extreme disengaged position with respect to said arcuate exterior engaging portion and an inner extreme engaged and locking position with respect to said arcuate exterior engaging portion radially displaced from the axis of rotation of said rotatable lockable member by a distance greater than the radius between said arcuate exterior engaging portion and said axis of rotation and a distance substantially equal to said radius, respectively, for effectively engaging and locking said arcuate exterior engaging portion when said rotatable member attempts to rotate in an inward direction in a manner effectively engaging and moving said locking member toward said inner engaged and locking position and corresponding to and correlated with the simultaneous attempted movement of said coupled pointer means in a direction opposite to said direction indicating increasing temperature on said indicia means, biasing means normally biasing said locking member toward said inner engaged and locking position, and manually operable overriding control member means effectively operable for temporarily overriding said biasing of said locking member toward said inner engaged and locking position whereby to release said rotatable member and the effectively coupled pointer means for simultaneous reverse movement thereof back to their initial starting positions with said pointer means moving in a direction opposite to said direction indicating increasing temperature on said indicia means and back to an initial starting minimum temperature location with respect to said indicia means.

8. Apparatus as defined in claim 7, wherein said magnifying lens means comprises a plano-convex transparent lens made of molded acrylic plastic resin material of a non-frangible type.

9. Apparatus as defined in claim 7, wherein said coupling means comprises a piston slidably mounted in said hollow tube in effective driven contact with a remote end surface of said working medium therein, said piston beng provided with a connecting rod extending into a position within said temperature indicating meter means and reading scale means and there being provided with a longitudinally toothed rack means, said coupling means also including a toothed pinion gear means in engagement with said rack means and effectively connected with respect to said pointer means for rotating same in response to longitudinal movement of said piston means.

10. Apparatus as defined in claim 7, wherein said coupling means comprises a piston slidably mounted in said hollow tube in effective driven contact with a remote end surface of said working medium therein, said piston being provided with a connecting rod extending into a position within said temperature indicating meter means and reading scale means and there being provided with a longitudinally toothed rack means, said coupling means also being provided with a tooth pinion gear means and movement-increasing gear train means connected thereto at an input end thereof and connected at an output end thereof to said pointer means for rotating same in response to longitudinal movement of said piston means.

11. Apparatus as defined in claim 7, including calibration means comprising relative rotary position adjustment means for relatively rotatively adjusting the initial position of said pointer means with respect to said arcuate indicia means of said scale panel to cause the indicated reading thereof to exactly correspond to the actual temperature to which said working medium is subjected.

12. Apparatus as defined in claim 7, including calibration means comprising means adjustably rotatively mounting said scale panel with respect to said pointer means and means for controllably locking said rotatably mounted scale panel in any selected relatively rotative position with respect to said pointer means.

13. Apparatus as defined in claim 7, wherein said coupling means comprises a piston slidably mounted in said hollow tube in effective driven contact with a remote end surface of said working medium therein, said piston being provided with a connecting rod extending into a position out of said tube and within said temperature indicating meter means and reading scale means and there being provided with rotatable crank means comprising two pivotally interconnected linkage members having one end pivotally connected to the upper end of said connecting rod and having the other end thereof firmly connected and coupled with respect to said pointer means for rotating same in response to longitudinal movement of said piston means.

14. A thermometer with an improved visibility temperature reading scale means, comprising: variable volume type thermometer means including a reservoir and tube extending therefrom interiorly provided with a temperature-responsive working medium; a temperature-indicating meter means and reading scale means including a scale panel arcuately provided with temperature-indicating indicia means and provided with pointer means rotatively mounted for relative rotary movement of said pointer means along said arcuately arranged indicia means to indicate a temperature reading; and linear-to-rotary movement coupling means having one end portion thereof effectively coupled with respect to said working medium within said tube, said coupling means having another end portion effectively engaged and coupled with respect to said rotary pointer means for rotating same in a direction indicating increasing temperature on said arcuate indicia means in response to volumetric change of said working medium as a result of increasing temperature thereof; and temperature-reading-holding means taking the form of one-way movement inactivating means effectively cooperable with respect to said coupling means for effectively causing said pointer means to be held in a temperature-indicating relationship with respect to said temperature-indicating indicia means in a manner positively preventing reverse rotation of said rotary pointer means in a direction indicating decreasing temperature on said indicia means but freely allowing said oppositely directed rotation of said rotary pointer means in said direction indicating increasing temperature on said indicia means, said one-way movement inactivating means comprising a rotatable lockable member coupled with respect to said rotary pointer means by way of said coupling means for movement therewith, and a locking member mounted adjacent to said rotatable lockable member for movement between a normal inner extreme engaged and locking position with respect to said rotatable lockable member for normally locking it in a manner positively preventing said reverse rotation of said pointer means and an outer extreme disengaged position with respect to said rotatable lockable member in response to rotation of said rotatable lockable member in a manner corresponding to rotation of said pointer means in a forward manner indicating increasing temperature on said indicia means, biasing means normally biasing said locking member toward said inner extreme engaged and locking position, and manually operable overriding means effectively operable for temporarily moving said locking member outwardly from said inner extreme engaged and locking position toward and into said outer extreme disengaged position with respect to said rotatable lockable member.

15. A thermometer with an improved visibility temperature reading scale means, comprising: variable volume type thermometer means including a reservoir and tube extending therefrom interiorly provided with a temperature-responsive working medium; a temperature indicating meter means and reading scale means including a scale panel arcuately provided with temperature-indicating indicia means and provided with pointer means rotatively mounted for relative rotary movement of said pointer means along said arcuately arranged indicia means to indicate a temperature reading; and linear-to-rotary movement coupling means having one end portion thereof effectively coupled with respect to said working medium within said tube, said coupling means having another end portion effectively engaged and coupled with respect to said rotary pointer means for rotating same in a direction indicating increasing temperature on said arcuate indicia means in response to volumetric change of said working medium as a result of increasing temperature thereof; and temperature-reading-holding means taking the form of one-way movement inactivating means effectively cooperable with respect to said coupling means for effectively causing said pointer means to be held in a temperature-indicating relationship with respect to said temperature-indicating indicia means in a manner positively preventing reverse rotation of said rotary pointer means in a direction indicating decreasing temperature on said indicia means but freely allowing said oppositely directed rotation of said rotary pointer means in said direction indicating increasing temperature on said indicia means, said one-way movement inactivating means comprising rollable wheel means coupled with respect to said rotary pointer means by way of said coupling means for free rotation thereof in a direction corresponding to rotation of said rotary pointer means in said direction indicating increasing temperature on said indicia means, said rollable wheel means having a frictional exterior rim portion spaced a predetermined radial distance from the center of rotation thereof, a snubbing pin means mounted adjacent to said frictional exterior rim portion of said rollable wheel means in a transversely directed manner substantially parallel to the axis of rotation of said rollable wheel means and movably mounted in a direction perpendicular thereto for movement between an outer extreme disengaged position with respect to said frictional exterior rim portion and an inner extreme engaged and locking position with respect to said frictional exterior rim portion radially displaced from the axis of rotation of said rollable wheel means by a distance greater than the radius between said frictional exterior rim portion and said axis of rotation and a distance substantially equal to said radius, respectively, for effectively frictionally engaging and locking said frictional exterior rim portion when said rollable wheel means attempts to rotate in an inward direction in a manner effectively frictionally engaging and moving said snubbing pin means toward said inner engaged and locking position and corresponding to and correlated with the simultaneous attempted rotation of said coupled rotary pointer means in a direction opposite to said direction indicating increasing temperature on said indicia means, biasing spring means normally biasing said snubbing pin means toward said inner engaged and locking position, and manually operable overriding control member means effectively operable for temporarily overriding said biasing of said snubbing pin means toward said inner engaged and locking position whereby to release said rollable wheel means and the effectively coupled rotary pointer means for simultaneous reverse rotation thereof back to their initial starting positions with said rotary pointer means rotating in a direction opposite to said direction indicating increasing temperature on said indicia means and back to an initial starting minimum temperature location with respect to said indicia means.

16 A thermometer with an improved visibility temperature reading scale means, comprising: variable volume type thermometer means including a reservoir and tube extending therefrom interiorly provided with a temperature-responsive working medium; a temperature-indicating meter means and reading scale means including a scale panel provided with temperature-indicating indicia means and provided with pointer means mounted for relative movement of said pointer means along said indicia means to indicate a temperature reading; and movement coupling means having one end portion thereof effectively coupled with respect to said working medium within said tube, said coupling means having another end portion effectively engaged and coupled with respect to said pointer means for moving same in a direction indicating increasing temperature on said indicia means in response to volumetric change of said working medium as a result of increasing temperature thereof; temperature-reading-holding means taking the form of one-way movement inactivating means cooperable for effectively causing said pointer means to be held in a temperature-indicating relationship with respect to said temperature-indicating indicia means in a manner positively preventing reverse movement of said pointer means in a direction indicating decreasing temperature on said indicia means but freely allowing said oppositely directed movement of said pointer means in said direction indicating increasing temperature on said indicia means, said one-way movement inactivating means comprising a rotatable lockable member coupled with respect to said pointer means for movement therewith, and a locking member mounted adjacent to said rotatable lockable member for movement between a normal engaged and locking position with respect to said rotatable lockable member for normally locking it in a manner positively preventing said reverse movement of said pointer means and a disengaged position with respect to said rotatable lockable member in response to rotation of said rotatable lockable member in a manner corresponding to movement of said pointer means in a forward direction indicating increasing temperature on said indicia means.

References Cited
UNITED STATES PATENTS

| | | | |
|---|---|---|---|
| 517,388 | 3/1894 | Linder | 73—368.3 |
| 1,460,249 | 4/1923 | Kraft | 73—417 |
| 2,220,590 | 11/1940 | Vogt | 116—124.6 |

LOUIS R. PRINCE, *Primary Examiner.*

W. HENRY, *Assistant Examiner.*